US008687568B2

(12) United States Patent
Montojo et al.

(10) Patent No.: US 8,687,568 B2
(45) Date of Patent: Apr. 1, 2014

(54) METHOD AND APPARATUS FOR SCRAMBLING FOR DISCRIMINATION OF SEMI PERSISTENT SCHEDULING GRANTS

(75) Inventors: Juan Montojo, San Diego, CA (US); Arnaud Meylan, Bois-Colombes (FR)

(73) Assignee: QUALCOMM Incorporated, San Diego, CA (US)

( * ) Notice: Subject to any disclaimer, the term of this patent is extended or adjusted under 35 U.S.C. 154(b) by 1078 days.

(21) Appl. No.: 12/403,137

(22) Filed: Mar. 12, 2009

(65) Prior Publication Data

US 2009/0232309 A1  Sep. 17, 2009

Related U.S. Application Data

(60) Provisional application No. 61/036,877, filed on Mar. 14, 2008.

(51) Int. Cl.
*H04W 4/00* (2009.01)
*H04B 7/212* (2006.01)
*H04W 72/00* (2009.01)

(52) U.S. Cl.
USPC ........... 370/329; 370/341; 370/348; 455/451; 455/452.1

(58) Field of Classification Search
USPC .................. 370/322, 329–330, 341, 348; 455/450–454, 464
See application file for complete search history.

(56) References Cited

U.S. PATENT DOCUMENTS

2004/0208199 A1    10/2004  Li
2005/0169349 A1*   8/2005   Hwang et al. ................. 375/130
2010/0202376 A1*   8/2010   Zhu et al. ..................... 370/329

OTHER PUBLICATIONS

Source: Nokia Corporation, Nokia Siemens Networks, 3GPP TSG-RAN WG1 Meeting #51bis, R1-080299, Sevilla, Spain, Jan. 14-18, 2008, pp. 1-3.*
International Search Report & Written Opinion—PCT/US09/037180 International Search Authority—European Patent Office—Dec. 4, 2009.
Mitsubishi Electric: "Blind detection complexity reduction with UE specific PDCCH scrambling" 3GPP Draft; RI-080405, 3rd Generation Partnership Project (3GPP), Mobile Competence Centre ; 650, Route Des Lucioles ; F-06921 Sophia-Antipolis Cedex ; France, vol. RAN WG1, No. Sevilla, Spain; Jan. 9, 2008, XP050108924 [retrieved on Jan. 9, 2008] p. 1.
Mitsubishi Electric: "UE specific PDCCH scrambling for blind detection complexity reduction" 3GPP Draft; RI-080850, 3rd Generation Partnership Project (3GPP), Mobile Competence Centre ; 650, Route Des Lucioles ; F-06921 Sophia-Antipolis Cedex ; France, vol. RAN WG1, No. Sorrento, I t a l y; Feb. 6, 2008, XP050109330 [retrieved on Feb. 6, 2008] p. 1.

(Continued)

*Primary Examiner* — Un C Cho
*Assistant Examiner* — Jeremy Costin
(74) *Attorney, Agent, or Firm* — Larry J. Moskowitz

(57) ABSTRACT

A method for wireless communications is provided. The method includes receiving a control payload and a check protocol on a wireless link and decoding the control payload and the check protocol. The method also includes analyzing the control payload and the check protocol in view of a scrambling protocol and determining at least one control command based on the control payload, the check protocol, and the scrambling protocol.

21 Claims, 11 Drawing Sheets

(56) References Cited

OTHER PUBLICATIONS

Nokia Corporation et al: "Persistent scheduling for DL" 3GPP Draft; R2-080683 Persistent Scheduling DL, 3rd Generation Partnership Project (3GPP), Mobile Competence Centre ; 650, Route Des Lucioles ; F-06921 Sophia-Antipolis Cedex ; France, vol. RAN WG2, No. Sorrento, Italy; Feb. 5, 2008, XP050138515 [retrieved on Feb. 5, 2008] p. 1.

Nokia Corporation et al: "Signaling of persistent allocation on PDCCH" 3GPP Draft; RI-080299 Signaling of Persistent Allocation on PDCCH, 3rd Generation Partnership Project (3GPP), Mobile Competence Centre ; 650, Route Des Lucioles ; F-06921 Sophia-Antipolis Cedex ; France, vol. RAN W61, No. Sevilla, Spain; Jan. 9, 2008, XP050108820 [retrieved on Jan. 9, 2008] p. 1 p. 3.

Taiwan Search Report—TW098108258—TIPO—Jul. 3, 2012.

\* cited by examiner

METHOD AND APPARATUS FOR SCRAMBLING FOR DISCRIMINATION OF SEMI PERSISTENT SCHEDULING GRANTS

CLAIM OF PRIORITY UNDER 35 U.S.C. §119

This application claims the benefit of U.S. Provisional Patent Application No. 61/036,877, entitled A METHOD AND APPARATUS FOR SCRAMBLING FOR DISCRIMINATION OF SEMI PERSISTENT SCHEDULING GRANTS, and filed on Mar. 14, 2008, the entirety of which is incorporated herein by reference.

BACKGROUND

I. Field

The following description relates generally to wireless communications systems, and more particularly to generation of control messages without employing additional control elements within existing messages.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple (NF) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the NF frequency subcarrier. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$. Generally, each of the NS independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

Semi-persistent scheduling (SPS) is a set of techniques for efficiently assigning resources for periodic traffic in a wireless communication system to support resource assignment with as little overhead as possible in order to improve system capacity. Current communication systems employ a 16-bit cyclic redundancy check (CRC) on physical downlink control channel (PDCCH) formats. Several formats exist for PDCCH, including downlink (DL), DL compact, UL, and power control. In addition various groupings can be performed. As a result the UE performs about 40 blind decodes per PDCCH per subframe. After decoding, the UE computes a CRC (X-CRC) over the decoded bits. The X-CRC is checked against the CRC indicated in the PDCCH. If there is a match, the PDCCH is deemed for the UE, its content is interpreted and appropriate actions are performed, i.e., either a transmission or a reception occurs. One problem with current decoding is that more than one grant type may be necessary to be generated and decoded.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods are provided to process multiple grants in wireless communications systems, where dynamic grants are discriminated from semi persistent scheduling (SPS) grants via the employment of scrambling codes. In general, the methods discriminate a dynamic grant (which is generally valid one time) from a semi-persistent grant (which repeats at a period indicated by radio resource control (RRC) until cancelled). In one aspect, an SPS scrambling code is defined. For dynamic grants, the scrambling operation is not used. For the SPS grant, the payload information and the associated cyclic redundancy check (CRC) is scrambled, where the length of the scrambling code is matched to the length of the payload and CRC. Thus, a device that has not been configured (by RRC) for SPS does not need to discriminate a dynamic from a SPS grant as all grants are considered dynamic. A device that has been configured for SPS by RRC discriminates dynamic from SPS grants as follows: If the CRC computed on the payload content matches with the CRC received, the payload indicates a dynamic grant. If, after descrambling the payload and CRC with the SPS scrambling code, the CRC computed on the payload content matches with the CRC received, then an SPS grant is indicated and subsequent processing can ensue. Substantially any type of control signal in addition to grants can be communicated by the associated scrambling and decoding sequences.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Systems and methods are provided to generate and determine control commands from scrambled sequences. For example, the control commands can include dynamic or semi persistent grants. In one aspect, a method for wireless communications is provided. The method employs a processor executing computer executable instructions stored on a computer readable storage medium to implement various acts. The method includes receiving a control payload and a check protocol on a wireless link and decoding the control payload and the check protocol. The method also includes analyzing the control payload and the check protocol in view of a scrambling protocol and determining at least one control command based on the control payload, the check protocol, and the scrambling protocol.

Figure 1:
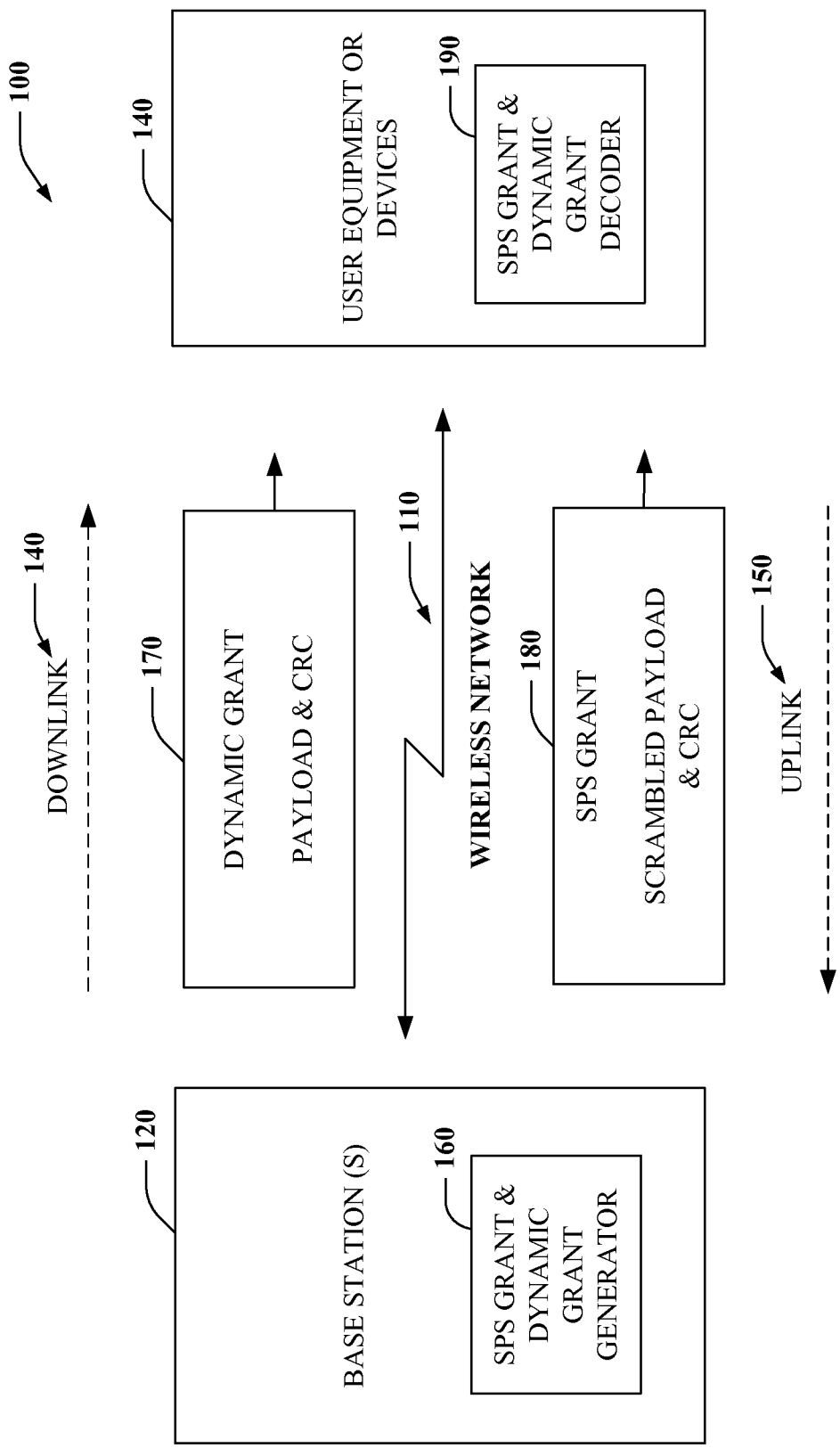
FIG. 1 is a high level block diagram of a system that employs scrambling protocols to determine control signals in a wireless communications system.

Referring now to FIG. 1, scrambling protocols are employed to determine control signals in a wireless communications system. The system 100 includes one or more base stations 120 (also referred to as a node, evolved node B-eNB, femto station, pico station, and so forth) which can be an entity capable of communication over a wireless network 110 to a second device 130 (or devices). For instance, each device 130 can be an access terminal (also referred to as terminal, user equipment, mobility management entity (MME) or mobile device). The base station 120 communicates to the device 130 via downlink 140 and receives data via uplink 150. Such designation as uplink and downlink is arbitrary as the device 130 can also transmit data via downlink and receive data via uplink channels. It is noted that although two components 120 and 130 are shown, that more than two components can be employed on the network 110, where such additional components can also be adapted for the wireless protocols described herein.

In one aspect, the base station includes a semi persistent scheduling (SPS) grant and dynamic grant generator or encoder component 160 (also referred to as generator). The generator transmits control commands such as a dynamic grant 170 or an SPS grant 180 that is received and processed by an SPS and dynamic grant decoder component 190. In general, control commands or otherwise are determined by whether or not scrambling is applied to the commands 170 or 180, respectively. The following discussion along with FIG. 2 describes in detail how control can be communicated through scrambling sequences. It is to be appreciated that scrambling can be applied to payload data to provide other types of control that the dynamic grant or SPS grants that are illustrated at 170 and 180.

In another aspect, radio resource controls (RRC) and physical downlink control channels (PDCCH) can be employed to enable semi persistent scheduling (SPS). There is a need to discriminate a dynamic grant (which is typically valid one time) from a semi-persistent grant (which repeats at periods indicated by the RRC until cancelled). Generally, the PDCCH contains a payload and a CRC, where the CRC is computed on the bits of the respective payload. For SPS, a scrambling code is defined which can be a pseudo random sequence such as a Gold or an M sequence for example. For dynamic PDCCH grants, the scrambling operation is generally not used. For SPS grants, the PDCCH information and CRC is scrambled. The length of the scrambling code is generally matched to the length of the PDCCH payload and the CRC. The scrambling code, protocol, or sequence is generally the same throughout the system 100.

Figure 2:
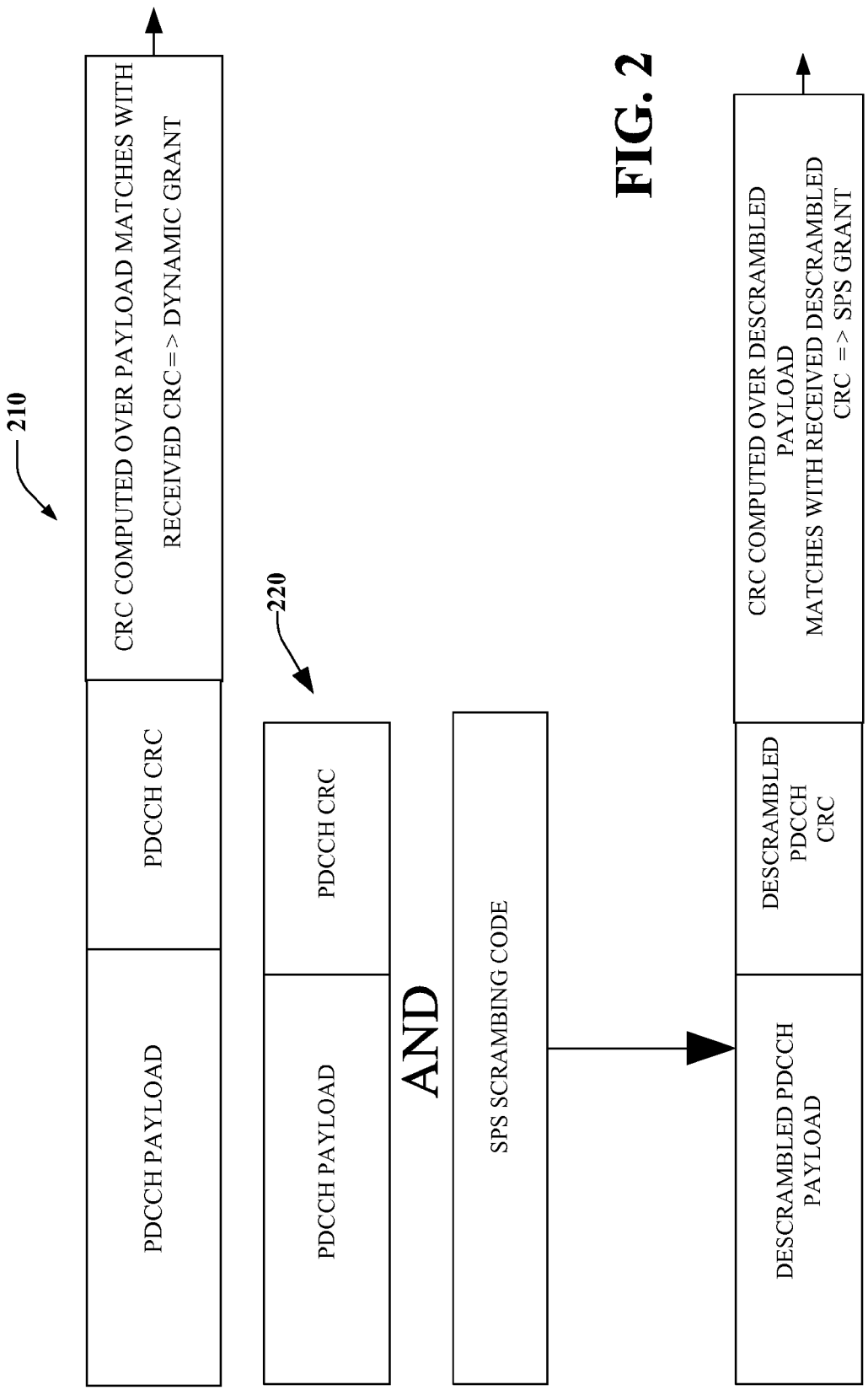
FIG. 2 is a diagram that illustrates dynamic grants and semi persistent grants that have been scrambled.

The user equipment 140 that has not been configured (by RRC) for SPS does not need to discriminate a dynamic from an SPS grant. Thus, all grants can be considered and processed as dynamic. User equipment 140 that has been configured for SPS by RRC discriminates dynamic from SPS grants as follows:

If the CRC computed on the PDCCH content matches with the CRC received, the PDCCH indicates a dynamic grant—this is shown at 210 of FIG. 2.

If, after descrambling the PDCCH (PDCCH payload and CRC) with the SPS scrambling code, the CRC computed on the PDCCH content matches with the CRC received, the PDCCH indicates an SPS grant—this process is shown at 220 of FIG. 2.

In yet another aspect, the system 100 supports various methods for wireless communications. This includes employing a processor executing computer executable instructions stored on a computer readable storage medium to implement various acts. The method can include receiving a control payload and a check protocol on a wireless link. This includes decoding the control payload and the check protocol while analyzing the control payload and the check protocol in view of a scrambling protocol. The method includes determining at least one control command based on the control payload, the check protocol, and the scrambling protocol. In one example, the control command is a dynamic grant and is determined by computing the check protocol on the control payload and comparing a received check protocol with the computed check protocol. In another example, the control command is a semi persistent scheduling (SPS) grant. As noted previously, other control commands can be encoded or decoded.

The SPS grant can be computed by descrambling the control payload and check protocol in view of an SPS scrambling protocol. This includes computing a check protocol on the control payload and comparing the check protocol to a received check protocol that is a cyclic redundancy check (CRC) in one example. The control payload can be a physical downlink control channel (PDCCH). The method also includes analyzing a configuration option to determine whether dynamic or semi persistent grants are enabled. Other command configurations are also possible. The configuration can be provided by a radio resource control (RRC) flag, for example. The method also includes processing the grants as dynamic grants if semi persistent grants have not been enabled. Other aspects include matching a length of the scrambling protocol with a length of the control payload and the check protocol, where the scrambling protocol can be a pseudo-random sequence. It is noted that the content of the grant or message (e.g., division of fields, bit-widths for each of the fields, and so forth) changes depending on whether or not the scrambling of the grant or message is detected at the receiver. Thus, the portion of the grant (e.g., payload, CRC or [payload-CRC]) is scrambled and can also be generic.

It is noted that the system 100 can be employed with an access terminal or mobile device, and can be, for instance, a module such as an SD card, a network card, a wireless network card, a computer (including laptops, desktops, personal digital assistants (PDAs)), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 3:
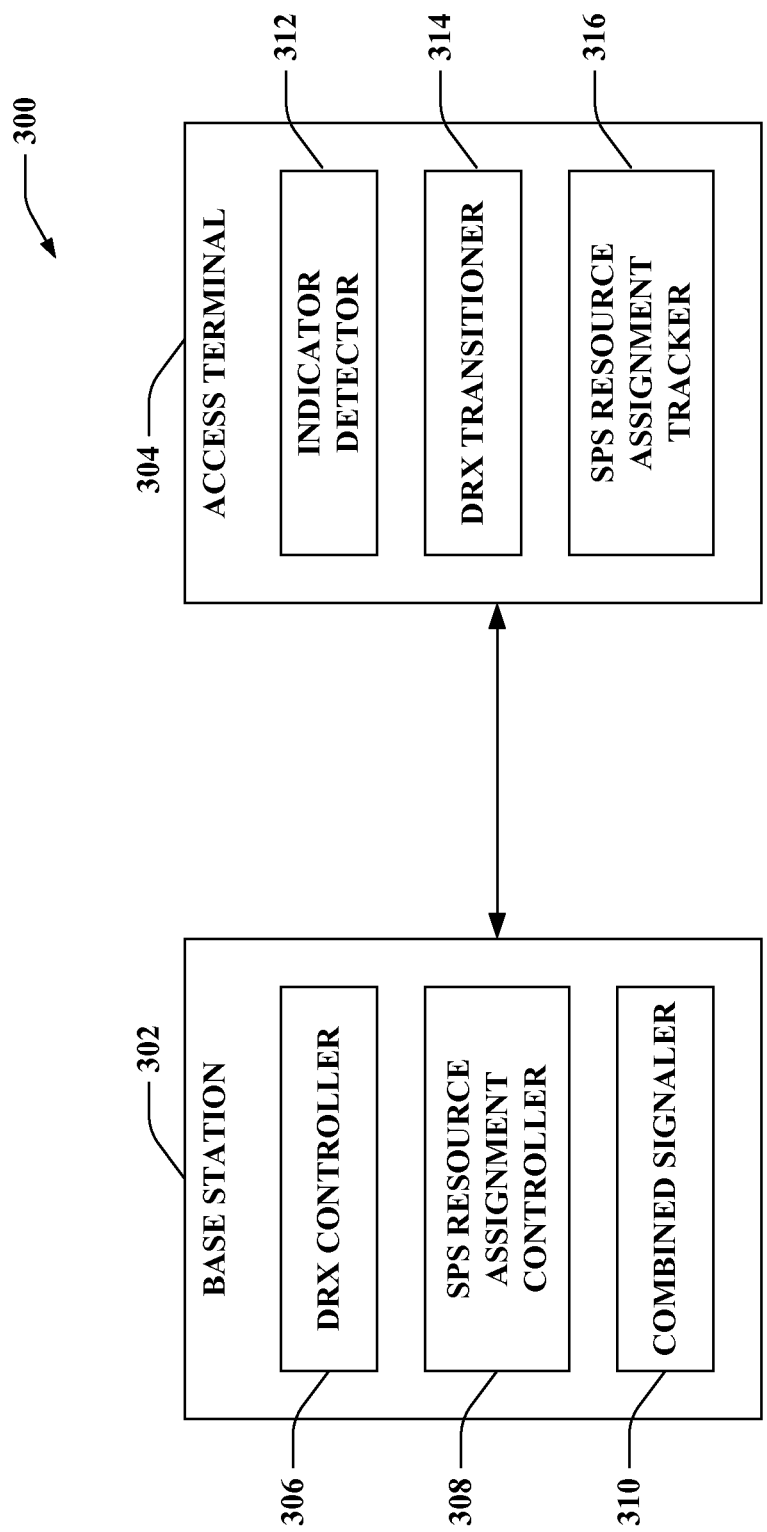
FIGS. 3 and 4 illustrate example semi persistent scheduling systems for wireless communications.

Referring to FIG. 3, an example system 300 is illustrated for processing SPS resources in a wireless communication environment. The system 300 includes a base station 302 that can transmit and/or receive information, signals, data, instructions, commands, bits, symbols, and the like. Base station 302 can communicate with an access terminal 304 via the forward link and/or reverse link. Access terminal 304 can transmit and/or receive information, signals, data, instructions, commands, bits, symbols, and the like. Moreover, although not shown, it is contemplated that any number of base stations similar to base station 302 can be included in system 300 and/or any number of access terminals similar to access terminal 304 can be included in system 300.

Base station 302 can further include a DRX controller 306, an SPS resource assignment controller 308, and a combined signaler 310. DRX controller 306 can manage a mode (e.g., active mode, DRX mode, . . . ) employed by access terminal 304. More particularly, DRX controller 306 can monitor and/or control a current mode employed by access terminal 304.

Further, DRX controller 306 can determine whether to cause access terminal 304 to transition between modes (e.g., switch from active mode to DRX mode, . . . ). For example, DRX controller 306 can evaluate an amount of data in a buffer intended for access terminal 304. DRX controller 306 can also analyze whether data will be transmitted or retransmitted to access terminal 304 prior to a beginning of a next DRX cycle. When DRX controller 306 recognizes that data likely will not be transmitted to access terminal 304 or received from access terminal 304 before the next DRX cycle, DRX controller 306 can initiate sending an indication (e.g., DRX indicator, . . . ) to access terminal 304 to cause access terminal 304 to transition to DRX mode. This indication, for instance, can stop a timer that maintains access terminal 304 in active mode, which can lead to access terminal 304 entering sleep mode (e.g., DRX mode, . . . ).

The SPS resource assignment controller 308 can manage semi-persistent resource assignments for access terminal 304. For instance, SPS resource assignment controller 308 can semi-persistently assign resources (e.g., downlink, uplink, . . . ) to access terminal 304. SPS resources allocated by SPS resource assignment controller 308 can thereafter be utilized by access terminal 304 for transmitting data over PUSCH or receiving data over PDSCH, for example. Further, SPS resource assignment controller 308 can determine whether to release SPS resources previously allocated to access terminal 304. By way of example, when DRX controller 306 decides to notify access terminal 304 to switch to DRX mode, SPS resource assignment controller 308 can release one or more SPS resources allotted to access terminal 304. Following this example, SPS resource assignment controller 308 can also instigate indicating (e.g., via a resource release indicator, . . . ) such release of the one or more SPS resources to access terminal 304. Pursuant to another illustration, SPS resource assignment controller 308 can select to release uplink SPS resource(s) (e.g., semi-persistently scheduled PUSCH resource(s), . . . ) and/or downlink SPS resource(s) (e.g., semi-persistently scheduled PDSCH resource(s), . . . ) assigned to access terminal 304. It is contemplated that SPS resource assignment controller 308 can release all SPS resources allocated to access terminal 304, a subset of the SPS resources allocated to access terminal 304, or the like.

Combined signaler 310 can generate and/or transmit indicators for access terminal 304 via the downlink. For instance, when initiated by DRX controller 306, combined signaler 310 can yield and/or send a DRX indicator (e.g., DRX command, that causes access terminal 304 to transition to DRX mode. The DRX indicator can notify access terminal 304 to operate its receiver in DRX mode. By way of another illustration, when instigated by SPS resource assignment controller 308, combined signaler 310 can yield and/or transfer a resource release indicator that notifies access terminal 204 that one or more SPS resources have been released by base station 302 (e.g., by SPS resource assignment controller 308, . . . ). According to an example, the resource release indicator can identify whether or not SPS resource(s) are released. By way of a further example, the resource release indicator can specify SPS resources that are (or are not) released by SPS resource assignment controller 308. Alternatively, the resource release indicator can signify that a predetermined subset or all SPS resources allocated to access terminal 304 are (or are not) released. Combined signaler 310 can transfer the DRX indicator and the resource release indicator in a single transaction.

Access terminal 304 can further include an indicator detector 312, a DRX transitioner 314, and an SPS resource assignment tracker 316. Indicator detector 312 can receive indicators sent by base station 302 (e.g., combined signaler 310, . . . ) via the downlink. For instance, within a common transaction, indicator detector 312 can obtain a DRX indicator that provides notification to switch to operating in DRX mode and a resource release indicator that provides notification as to one or more SPS resources, which were previously assigned to access terminal 304, that have been released by base station 302.

DRX transitioner 314 can cause access terminal 304 to enter DRX mode (e.g., sleep mode, . . . ) based upon the DRX indicator received by indicator detector 312. For example, if a timer is maintaining access terminal 304 in active mode, DRX transitioner 314 can halt the timer and effectuate switching to DRX mode operation.

Moreover, SPS resource assignment tracker 316 can monitor and/or identify resources (e.g., uplink resources, downlink resources, . . . ) that are semi-persistently assigned by base station 302 to access terminal 304. By way of example, SPS resource assignment tracker 316 can recognize when resources are added or removed from being semi-persistently assigned to access terminal 304 based upon received indications. An obtained resource release indicator can notify SPS resource assignment tracker 316 that one or more SPS resources have been released from being allocated to access terminal 304, and SPS resource assignment tracker 316 can remove these one or more SPS resources from a set of SPS resources assigned to access terminal 304. Thus, SPS resource assignment tracker 316 can recognize that access terminal 304 is to forgo transmitting data using uplink resource(s) or receiving data using downlink resource(s) that have been removed from the set of assigned SPS resources (e.g., until subsequent assignment, . . . ).

Figure 4:
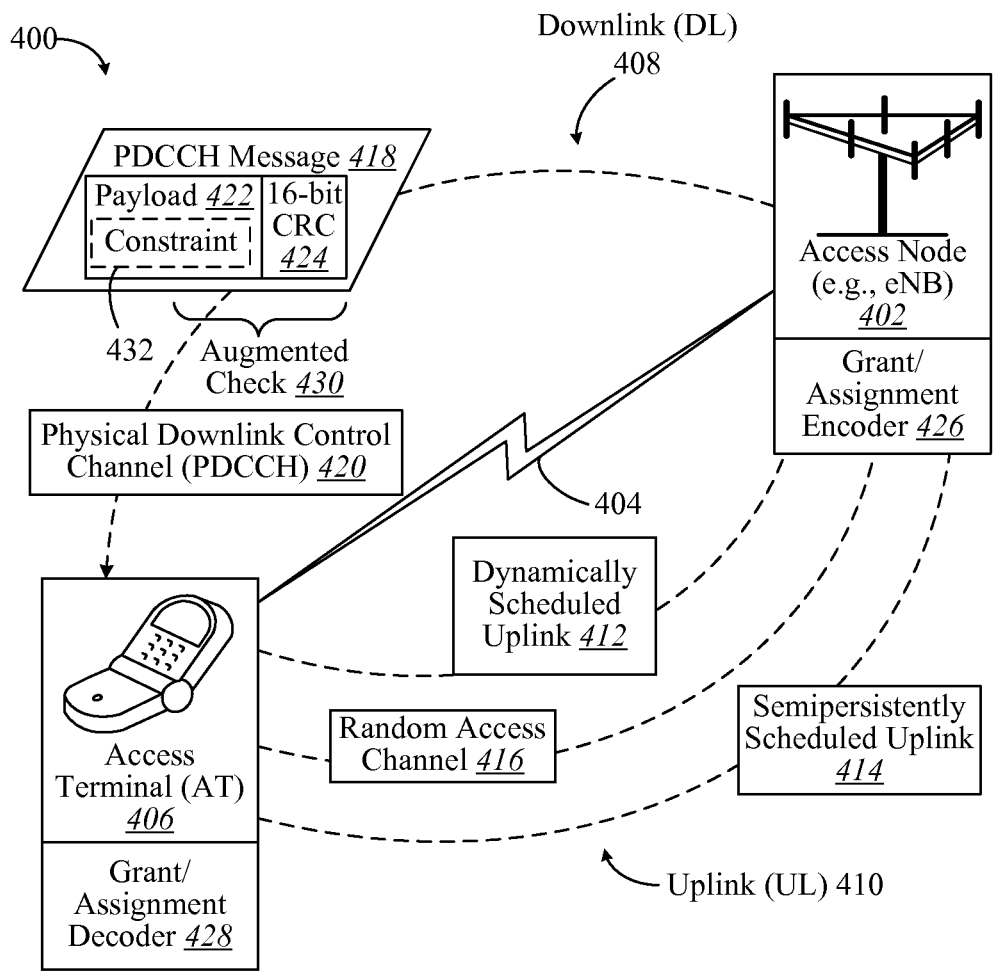

Referring to FIG. 4, an alternative system 400 is illustrated for processing dynamic and SPS grants. A communication system 400 of an access node (AN) 402 communicates via an over-the-air (OTA) link 404 with an access terminal (AT) 406, also referred herein as user equipment (UE), in a fully scheduled manner on both a downlink (DL) 408 and/or an uplink (UL) 410 for dynamic scheduling, the latter depicted in particular as a dynamically scheduled uplink 412. The AT 406 is capable of transmitting on the UL 410 with semi-persistent scheduling (SPS) on an SPS uplink 414. In anticipation of a talk spurt for VoIP communication (e.g., an SPS request on a random access channel (RACH) 416), for instance, the AN 402 can present an indication for SPS (e.g., DL assignment, UL grant) as part of a message 418 on a physical downlink control channel (PDCCH) 420. The message 418 comprises a PDCCH payload 422 and a check field, depicted as a 16-bit CRC (cyclic redundancy check) 424.

Some types of communication lend themselves to semi-persistent scheduling (SPS), such as VoIP. The recurring nature but relatively small amounts of data transmitted warrant a relaxation in the overhead of fully scheduling the uplink transmissions. The AN 402 utilizes a grant/assignment encoder 426 and the AT 406 utilizes a grant/assignment decoder 428 that incorporate a more robust check encoding/decoding that used for dynamic or SPS scheduling. In particular, an augmented check 430 is achieved by applying a constraint 432 to the PDCCH payload 422 in conjunction with or as a condition precedent to determining validity based upon the CRC 424.

Figure 5:
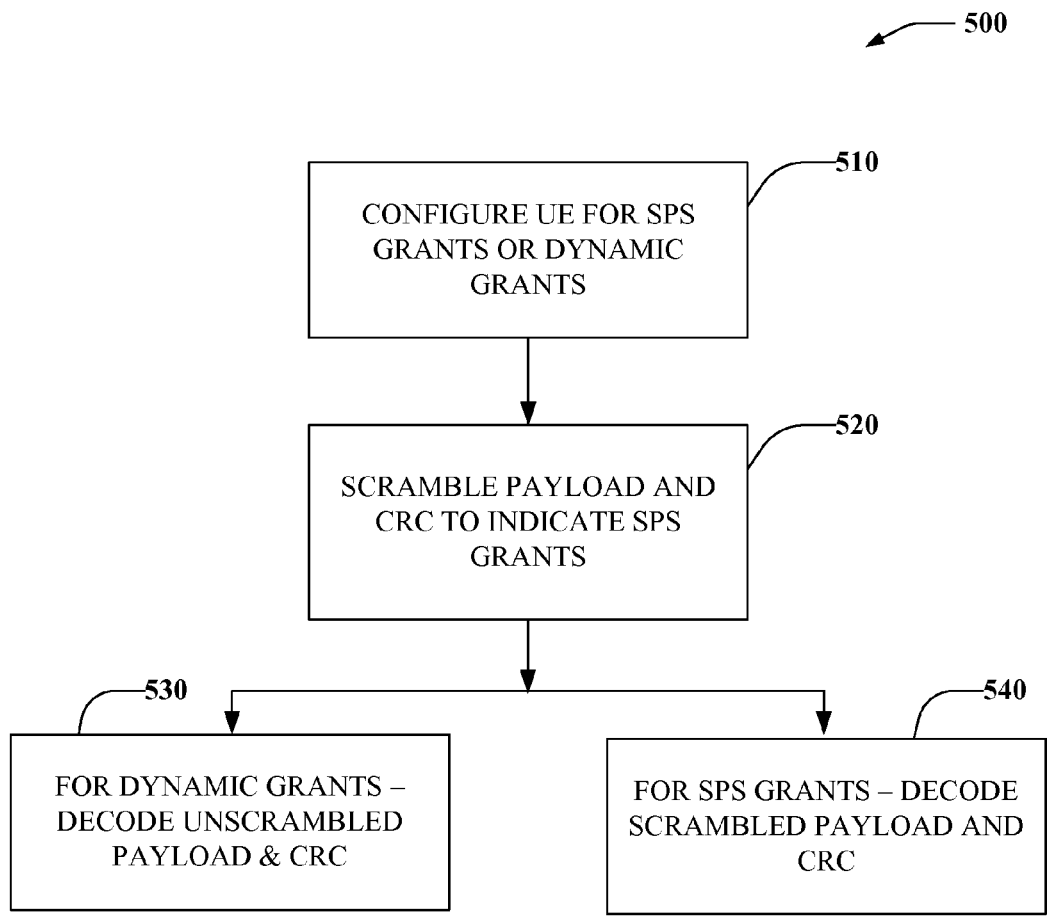
FIG. 5 illustrates a wireless communications method that employs scrambling sequences to discriminate between dynamic grants and semi persistent scheduling grants.

Referring now to FIG. 5, a wireless communications methodology 500 is illustrated. While, for purposes of simplicity of explanation, the methodology (and other methodologies described herein) are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Proceeding to 510, user equipment is configured to process semi persistent scheduling (SPS) grants or dynamic grants. As noted previously, such configuration can be provided via a radio resource control (RRC), for example. At 520, payload and CRC data is scrambled for the SPS grants. At 520, if dynamic grants have been selected at 510, then such grants are signaled by decoding an unscrambled payload and CRC. If SPS grants have been selected at 510, then scrambled payloads and associated CRC's are decoded at 540. As noted previously, when the user equipment has not been configured for SPS, it does not need to discriminate a dynamic from an SPS grant. Thus, all grants can be considered and processed as dynamic at 530. User equipment that has been configured for SPS at 510 discriminates dynamic from SPS grants as follows and as previously noted:

If the CRC computed on the PDCCH content matches with the CRC received, the PDCCH indicates a dynamic grant.

If, after descrambling the PDCCH (PDCCH payload and CRC) with the SPS scrambling code, the CRC computed on the PDCCH content matches with the CRC received, the PDCCH indicates an SPS grant.

The techniques described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

Figure 6:
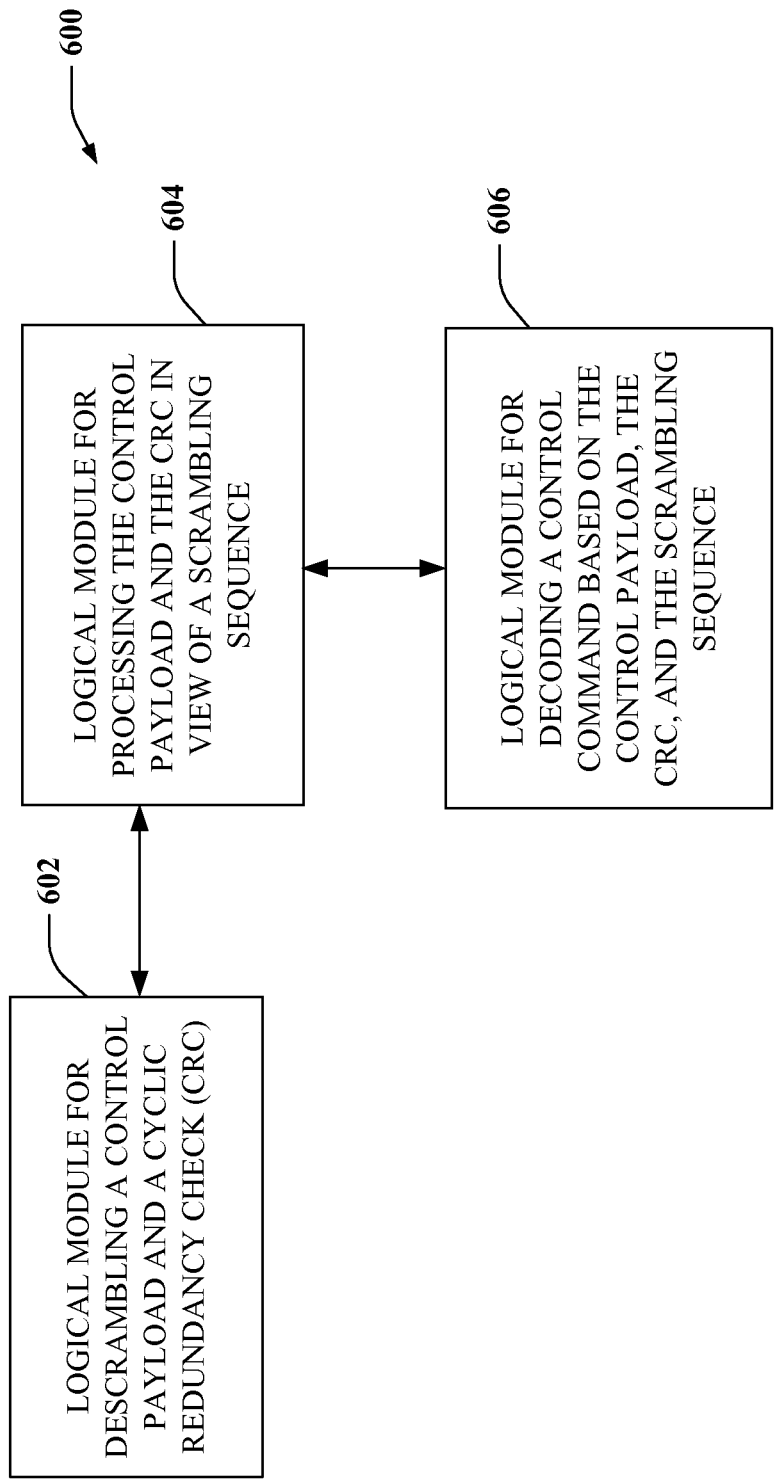
FIG. 6 illustrates an example logical module for a wireless protocol.
Figure 7:
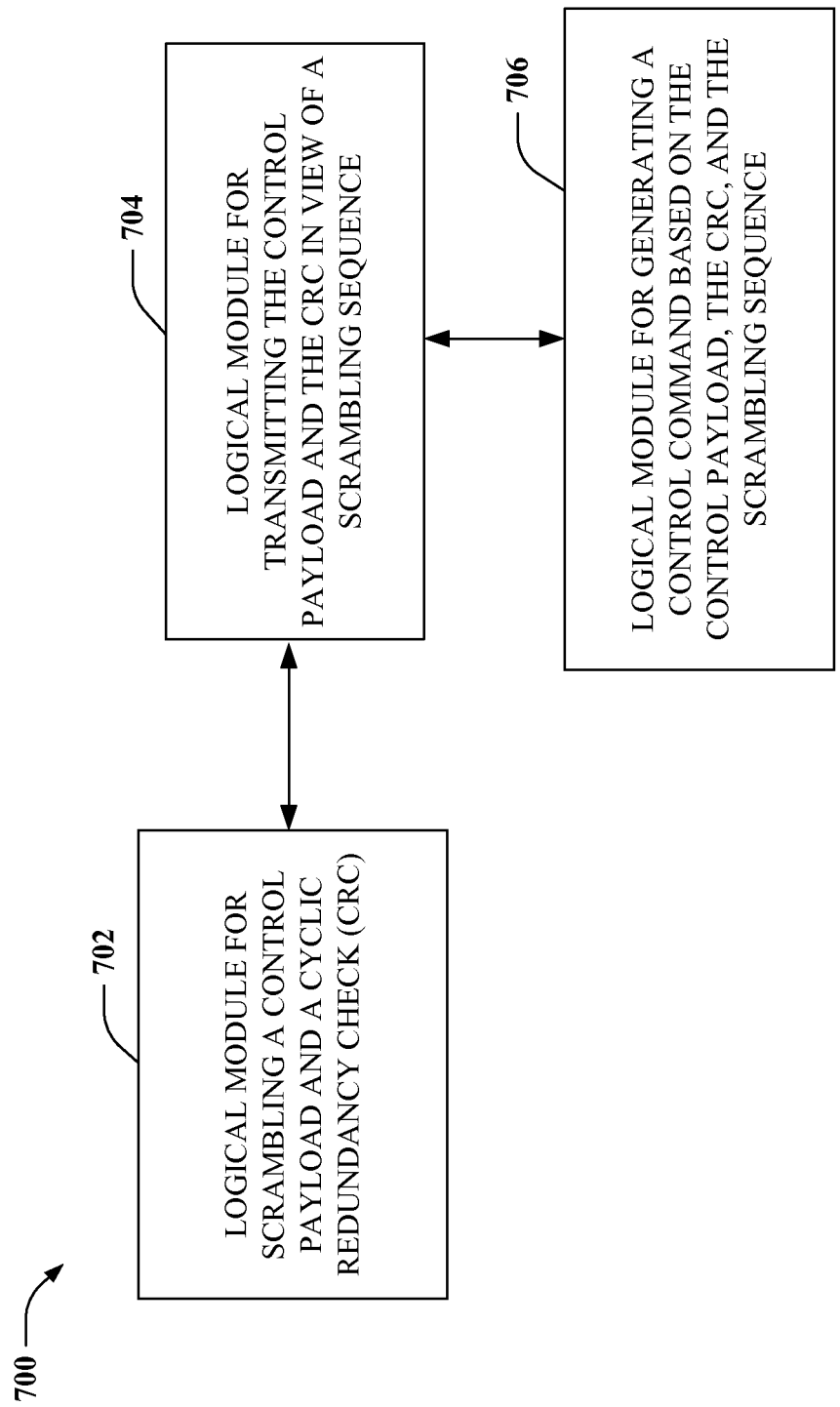
FIG. 7 illustrates an example logical module for an alternative wireless protocol.

Turning now to FIGS. 6 and 7, a system is provided that relates to wireless signal processing. The systems are represented as a series of interrelated functional blocks, which can represent functions implemented by a processor, software, hardware, firmware, or any suitable combination thereof.

Referring to FIG. 6, a wireless communication system 600 is provided. The system 600 includes a logical module 602 for descrambling a control payload and a cyclic redundancy check (CRC). The system 600 includes a logical module 604 for processing the control payload and the CRC in view of a scrambling sequence. This also includes a logical module 606 for decoding a control command based on the control payload, the CRC, and the scrambling sequence.

Referring to FIG. 7, a wireless communication system 700 is provided. The system 700 includes a logical module 702 for scrambling a control payload and a cyclic redundancy check (CRC). The system 700 includes a logical module 704 for transmitting the control payload and the CRC in view of a scrambling sequence and a logical module 706 for generating a control command based on the control payload, the CRC, and the scrambling sequence.

Figure 8:
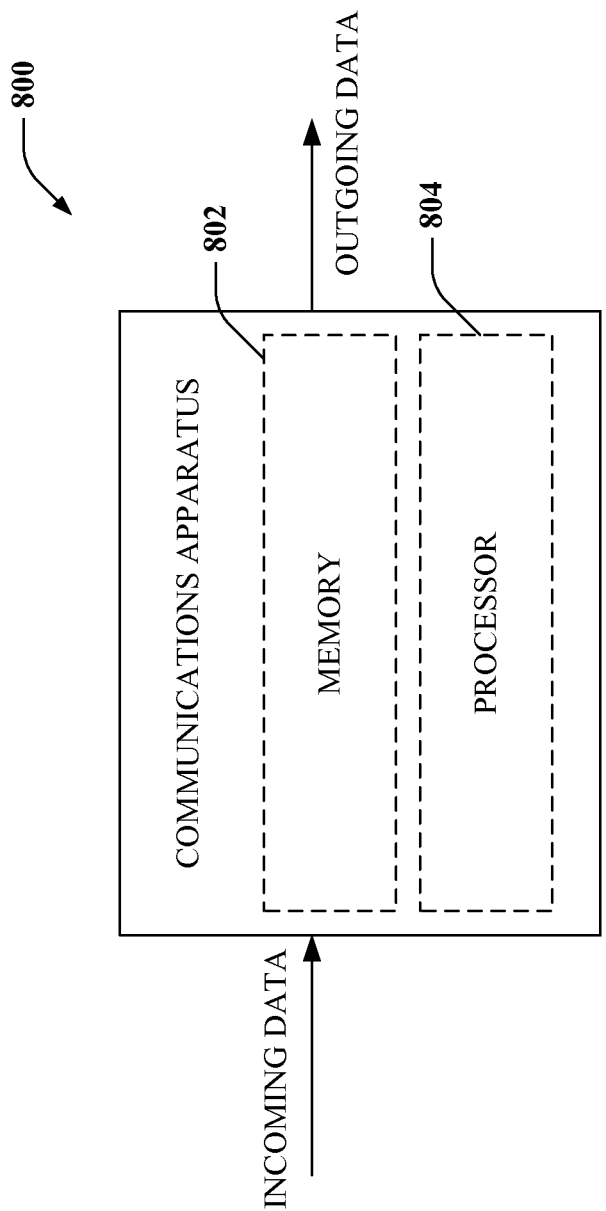
FIG. 8 illustrates an example communications apparatus that employs a wireless protocol.

FIG. 8 illustrates a communications apparatus 800 that can be a wireless communications apparatus, for instance, such as a wireless terminal. Additionally or alternatively, communications apparatus 800 can be resident within a wired network. Communications apparatus 800 can include memory 802 that can retain instructions for performing a signal analysis in a wireless communications terminal. Additionally, communications apparatus 800 may include a processor 804 that can execute instructions within memory 802 and/or instructions received from another network device, wherein the instructions can relate to configuring or operating the communications apparatus 800 or a related communications apparatus.

Figure 9:
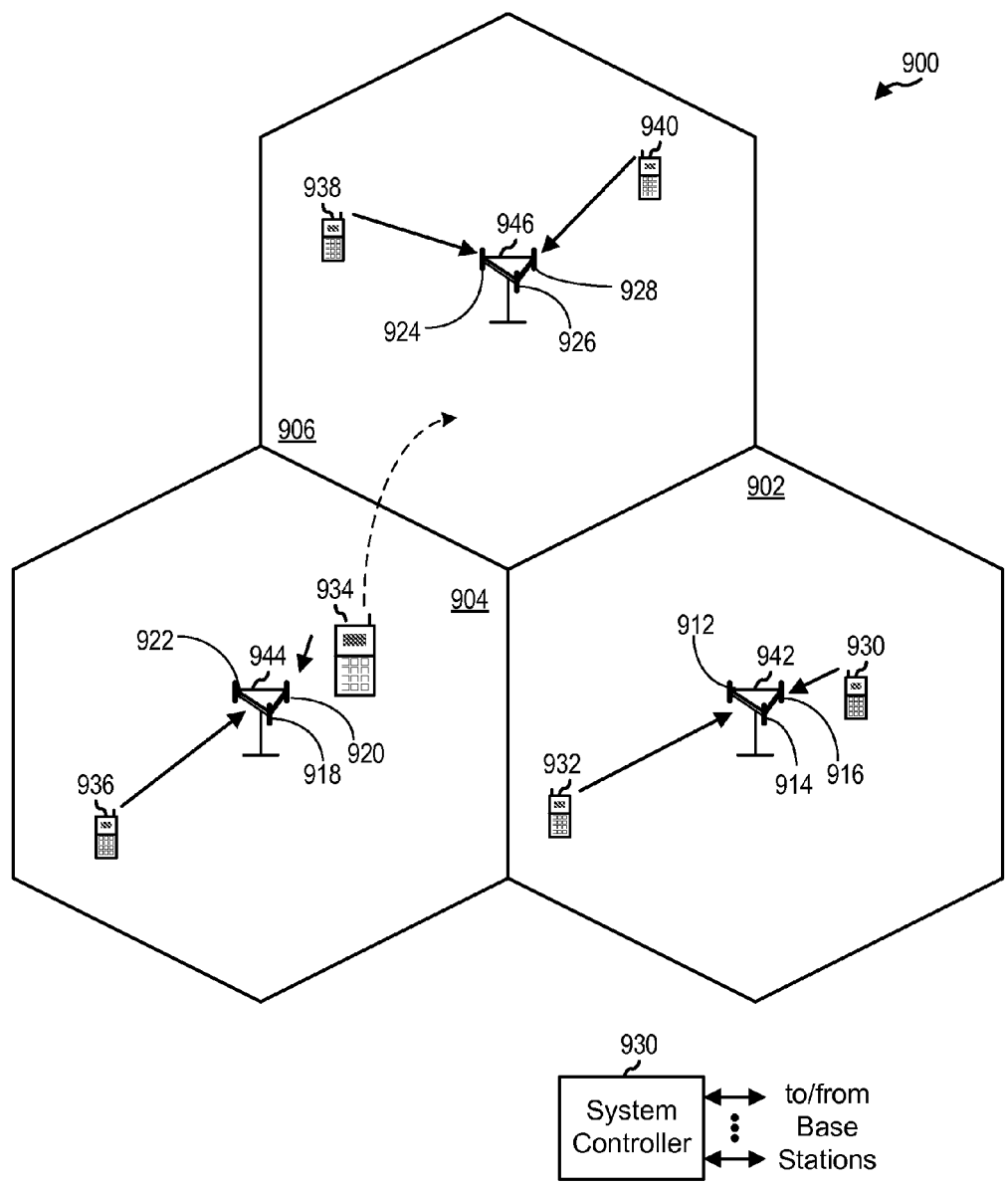
FIG. 9 illustrates a multiple access wireless communication system.

Referring to FIG. 9, a multiple access wireless communication system 900 is illustrated. The multiple access wireless communication system 900 includes multiple cells, including cells 902, 904, and 906. In the aspect the system 900, the cells 902, 904, and 906 may include a Node B that includes multiple sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 can include several wireless communication devices, e.g., User Equipment or UEs, which can be in communication with one or more sectors of each cell 902, 904 or 906. For example, UEs 930 and 932 can be in communication with Node B 942, UEs 934 and 936 can be in communication with Node B 944, and UEs 938 and 940 can be in communication with Node B 946.

Figure 10:
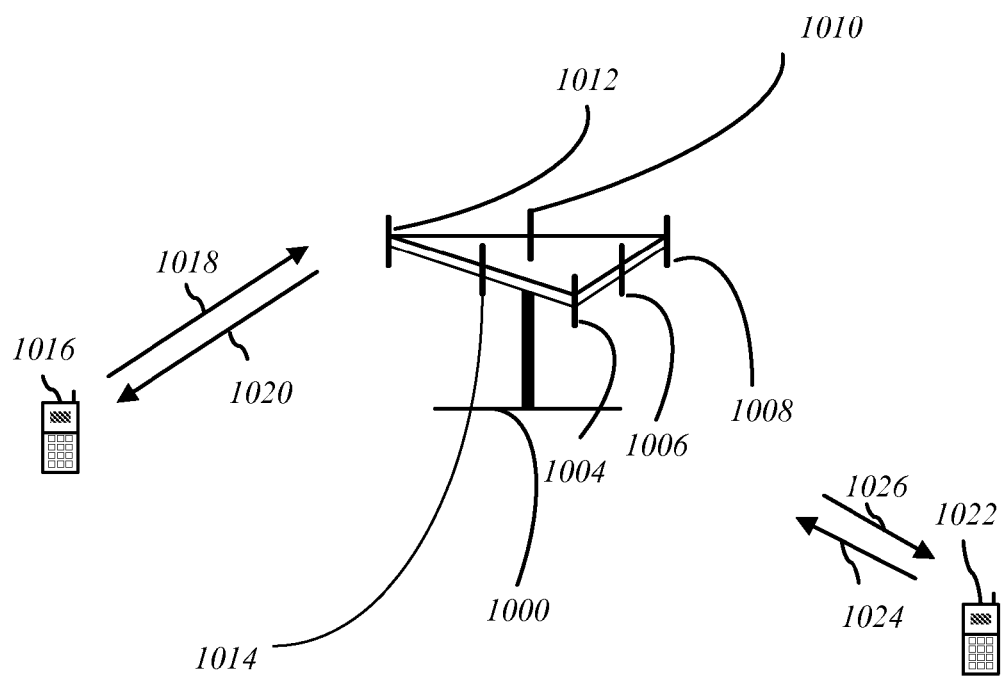
FIGS. 10 and 11 illustrate example communications systems.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1024. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
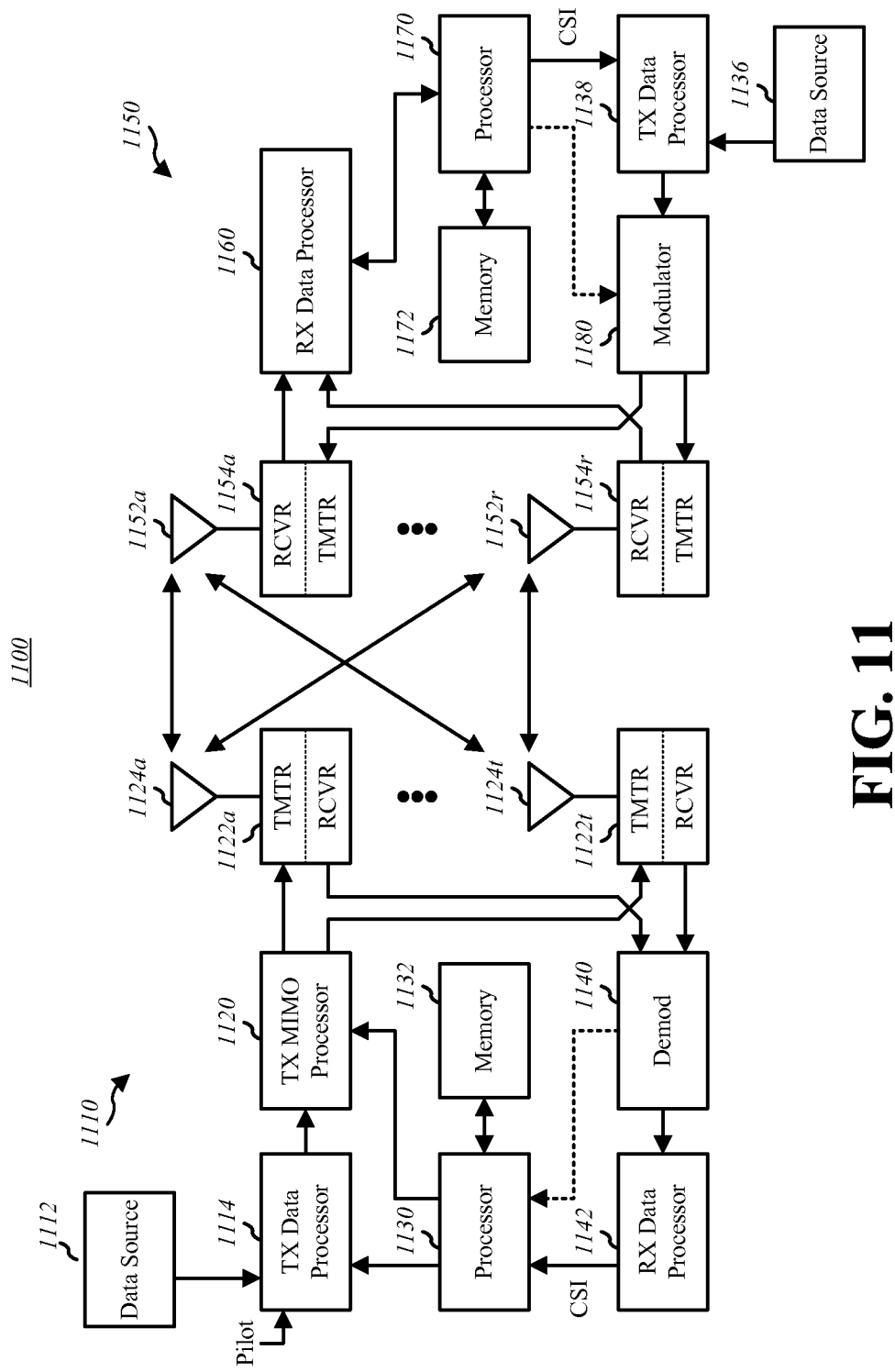

Referring to FIG. 11, a system 1100 illustrates a transmitter system 210 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122a through 1122t. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122a through 1122t are then transmitted from NT antennas 1124a through 1124t, respectively.

At receiver system 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which pre-coding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH), for example.

The UL PHY Channels comprises: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH), for example.

Other terms/components include: 3G 3rd Generation, 3GPP 3rd Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, ARQ Automatic repeat request, BCCH Broadcast control channel, BTS Base transceiver station, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, DCI Downlink control indicator, DFT Discrete Fourier transform, DFT-SOFDM Discrete Fourier transform spread OFDM, DL Downlink (base station to subscriber transmission), DL-SCH Downlink shared channel, D-PHY 500 Mbps physical layer, DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNB Evolved Node B, EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still yet other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QPSK Quadrature phase shift keying, RACH Random access channel, RAT Radio access technology, RB Resource block, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, SAE System architecture evolution, SAP Service access point, SC-FDMA Single carrier frequency division multiple access, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TR Technical report, TrCH Transport channel, TS Technical specification, TTA Telecommunications Technology Association, TTI Transmission time interval, UCI Uplink control indicator, UE User equipment, UL Uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access It is noted that various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

As used in this application, the terms "component," "module," "system," "protocol," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for wireless communications, comprising:
   receiving a control payload and a check protocol on a wireless link;
   decoding the control payload and the check protocol;
   analyzing the control payload and the check protocol in view of a scrambling protocol, including descrambling the decoded control payload and the decoded check protocol; and
   determining at least one control command based on the control payload, the check protocol, and the scrambling protocol;
   wherein, in response to a check protocol computed on the decoded control payload matching with the decoded check protocol received, processing the control command as a dynamic grant; and
   wherein, in response to a decoded and descrambled check protocol, computed on the decoded and descrambled control payload after descrambling the decoded control payload and decoded check protocol with the scrambling protocol, matching with the decoded and descrambled check protocol received, processing the control command as a semi persistent grant;
   wherein the dynamic grant is valid one time and the semi persistent grant repeats.

2. The method of claim 1, the check protocol is a cyclic redundancy check (CRC).

3. The method of claim 1, the control payload is a physical downlink control channel (PDCCH).

4. The method of claim 1, further comprising analyzing a configuration option to determine whether dynamic or semi persistent grants are enabled.

5. The method of claim 4, the configuration is provided by a radio resource control (RRC) flag.

6. The method of claim 4, further comprising processing all grants as dynamic grants if semi persistent grants have not been enabled.

7. The method of claim 1, further comprising matching a length of the scrambling protocol with a length of the control payload and the check protocol.

8. The method of claim 7, the scrambling protocol is a pseudo-random sequence.

9. The method of claim 8, the scrambling protocol is based on a Gold sequence or an M sequence.

10. A communications apparatus, comprising:
    a memory that retains instructions for decoding a payload and a cyclic redundancy check (CRC), processing the payload and the CRC in view of a scrambling code, including descrambling the decoded control payload and the decoded check protocol, and determining a command based on the payload, the CRC, and the scrambling code;
    wherein the instructions further include, in response to a CRC computed on the decoded payload matching with the decoded CRC received, processing the command as a dynamic grant; and
    wherein the instructions further include, in response to a decoded and descrambled CRC, computed on the decoded and descrambled payload after descrambling the decoded payload and decoded CRC with the scrambling code, matching with the decoded and descrambled CRC received, processing the command as a semi persistent grant;
    wherein the dynamic grant is valid one time and the semi persistent grant repeats; and
    a processor that executes the instructions.

11. The apparatus of claim 10, the payload is a physical downlink control channel (PDCCH).

12. A non-transitory computer-readable medium having program code stored thereon, comprising:
 code executable by at least one processor for decoding a control payload and a check protocol from a wireless link;
 code executable by the at least one processor for descrambling the decoded control payload and the decoded check protocol;
 code executable by the at least one processor for processing the control payload and the check protocol in view of a scrambling sequence; and
 code executable by the at least one processor for executing at least one control command based on the control payload, the check protocol, and the scrambling sequence;
 wherein said code for executing further includes, in response to a check protocol computed on the decoded control payload matching with the decoded check protocol received, processing the control command as a dynamic grant; and
 wherein said code for executing further includes, in response to a decoded and descrambled check protocol, computed on the decoded and descrambled control payload after descrambling the decoded control payload and decoded check protocol with the scrambling sequence, matching with the decoded and descrambled check protocol received, processing the control command as a semi persistent grant;
 wherein the dynamic grant is valid one time and the semi persistent grant repeats.

13. The non-transitory computer-readable medium of claim 12, the control payload is a physical downlink control channel (PDCCH) and the check protocol is a cyclic redundancy check (CRC).

14. A processor that executes the following instructions stored on a non-transitory computer-readable medium:
 decoding a downlink payload and a cyclic redundancy check (CRC);
 processing the downlink payload and the CRC in view of a scrambling sequence, including descrambling the decoded downlink payload and the decoded CRC; and
 determining at least one control command based on the downlink payload, the CRC, and the scrambling sequence;
 wherein, in response to a CRC computed on the decoded downlink payload matching with the decoded CRC received, processing the control command as a dynamic grant; and
 wherein, in response to a decoded and descrambled CRC, computed on the decoded and descrambled downlink payload after descrambling the decoded downlink payload and decoded CRC with the scrambling sequence, matching with the decoded and descrambled CRC received, processing the control command as a semi persistent grant;
 wherein the dynamic grant is valid one time and the semi persistent grant repeats.

15. A method for wireless communications, comprising:
 generating a control payload and a check protocol on a wireless link;
 scrambling the control payload and the check protocol in view of a grant type specific scrambling protocol; and
 generating at least one control command based on the control payload, the check protocol, and the scrambling protocol, including encoding a non-scrambled control payload and a non-scrambled check protocol computed on the non-scrambled control payload to generate a dynamic grant, and encoding the scrambled control payload and the scrambled check protocol computed on the non-scrambled control payload to generate a semi persistent grant, wherein the dynamic grant is valid one time and the semi persistent grant repeats.

16. A communications apparatus, comprising:
 a memory that retains instructions for generating a payload and a cyclic redundancy check (CRC), scrambling the payload and the CRC with a scrambling code according to a grant type specific scrambling protocol, and generating a grant based on the payload, the CRC, and the scrambling code, including encoding a non-scrambled payload and a non-scrambled CRC computed on the non-scrambled control payload to generate a dynamic grant, and encoding the scrambled payload and the scrambled CRC computed on the non-scrambled control payload to generate a semi-persistent grant, wherein the dynamic grant is valid one time and the semi persistent grant repeats; and
 a processor that executes the instructions.

17. A non-transitory computer-readable medium having program code stored thereon, comprising:
 code executable by at least one processor for generating a control payload and a check protocol across a wireless link;
 code executable by the at least one processor for scrambling the control payload and the check protocol according to a grant type specific scrambling protocol;
 code executable by the at least one processor for processing the control payload and the check protocol in view of a scrambling sequence; and
 code executable by the at least one processor for generating at least one control command based on the control payload, the check protocol, and the scrambling sequence, including encoding a non-scrambled control payload and a non-scrambled check protocol computed on the non-scrambled control payload to generate a dynamic grant, and encoding the scrambled control payload and the scrambled check protocol computed on the non-scrambled control payload to communicate a semi persistent grant, wherein the dynamic grant is valid one time and the semi persistent grant repeats.

18. The non-transitory computer-readable medium of claim 17, the control payload is a physical downlink control channel (PDCCH) and the check protocol is a cyclic redundancy check (CRC).

19. A processor that executes the following instructions stored on a non-transitory computer-readable medium:
 scrambling a downlink payload and a cyclic redundancy check (CRC) according to a grant type specific scrambling protocol;
 processing the downlink payload and the CRC in view of a scrambling sequence; and
 encoding at least one control command based on the downlink payload, the CRC, and the scrambling sequence, including encoding a non-scrambled downlink payload and a non-scrambled CRC computed on the non-scrambled downlink payload to generate a dynamic grant, and encoding the scrambled downlink payload and the scrambled CRC computed on the non-scrambled downlink payload to generate a semi-persistent grant, wherein the dynamic grant is valid one time and the semi persistent grant repeats.

20. The processor of claim 19, further comprising a variable field describing a grant or message that changes depending on whether or not scrambling of the grant or message is detected at a receiver.

21. The processor of claim 20, the variable field includes division of fields, bit-widths for the fields, a payload, a CRC or a payload-CRC, where the variable field is scrambled and generic.

* * * * *